United States Patent
Bobenhausen

(10) Patent No.: US 8,342,578 B2
(45) Date of Patent: Jan. 1, 2013

(54) METHOD AND APPARATUS FOR CONNECTING A HOSE TO A FITTING

(76) Inventor: Larry F. Bobenhausen, St. Petersburg, FL (US)

( * ) Notice: Subject to any disclaimer, the term of this patent is extended or adjusted under 35 U.S.C. 154(b) by 1042 days.

(21) Appl. No.: 12/336,723

(22) Filed: Dec. 17, 2008

(65) Prior Publication Data

US 2010/0148490 A1 Jun. 17, 2010

(51) Int. Cl.
*F16L 55/00* (2006.01)
(52) U.S. Cl. .......... 285/23; 285/252; 285/256
(58) Field of Classification Search .......... 285/256, 285/23, 252
See application file for complete search history.

(56) References Cited

U.S. PATENT DOCUMENTS

| | | | | |
|---|---|---|---|---|
| 3,174,777 A | * | 3/1965 | Evans et al. | 285/252 |
| 3,463,517 A | * | 8/1969 | Jeromsom, Jr. et al. | 285/253 |
| 3,574,355 A | * | 4/1971 | Oetiker | 285/256 |
| 4,607,867 A | * | 8/1986 | Jansen | 285/252 |
| 6,010,162 A | * | 1/2000 | Grau et al. | 285/256 |
| 6,206,048 B1 | | 3/2001 | Bobenhausen | |
| 7,090,255 B2 | * | 8/2006 | Clarke et al. | 285/252 |
| 7,108,291 B2 | * | 9/2006 | Baxi et al. | 285/257 |
| 7,905,520 B2 | * | 3/2011 | Scherer et al. | 285/252 |
| 8,091,928 B2 | * | 1/2012 | Carrier et al. | 285/257 |

\* cited by examiner

*Primary Examiner* — David E Bochna
(74) *Attorney, Agent, or Firm* — Larson & Larson, P.A.; Frank Liebenow; Justin Miller

(57) ABSTRACT

An application for a clamp guide for joining a flexible hose to a rigid, hollow shaft having at least two beads, the clamp guide has an arced surface for interfacing with a head bead of the at least two beads and two clamp guide arms. Each of the clamp guide arms has at least two bumps and each bump is aligned with one of the beads thereby forming registration areas between each pair of bumps. The arced surface has an inner diameter equal to an outer diameter of the rigid, hollow shaft and the arced surface has an inner circumferential length greater than one half of the circumference of the rigid, hollow shaft.

4 Claims, 6 Drawing Sheets

METHOD AND APPARATUS FOR CONNECTING A HOSE TO A FITTING

FIELD OF THE INVENTION

This invention relates to a method for connecting a hose to a fitting. More particularly, it refers to a method of connecting a hose to a fitting using one or more clamps.

BACKGROUND

Air conditioning hose assembly connection systems are known. The simplest is to fit an end of a flexible, compressible hose over a metal fitting or stem and attaching clamps on the hose over the fitting to hold the hose to the fitting and to prevent leaks in various applications such as with high pressure refrigerants. Often, this is not sufficient for such high pressure connections because the hose tends to slip off the fitting. To improve this type of connection, the fitting is made with one or more ridges or beads that help hold the hose to the fitting. Still, in high-pressure applications, it is still possible for the hose to come free from the fitting.

To further improve the connection, guides have been deployed to guide the installation of the clamps such that the clamps situate themselves between the ridges/beads, making it even more difficult for the hose to slip off of the fitting.

What is needed is a guide that aligns the clamps between the ridges/beads and provides improved force to hold the hose to the fitting.

SUMMARY OF THE INVENTION

The invention includes a method of joining a flexible hose to a rigid, hollow shaft. The rigid, hollow shaft has a groove/bead and at least one hose bead (a bead that will be positioned beneath the hose). The method includes the steps of (a) providing a clamp guide, the clamp guide has an arced surface for interfacing with the groove/bead, two clamp guide arms each having at least one bump and each bump corresponding to and aligned with each hose bead thereby forming registration areas between the bumps. The arced surface has an inner diameter equal to an outer diameter of the rigid hollow shaft and an inner circumferential length greater than one half of the circumference of the rigid hollow shaft. The arced surface has an arc of greater than 180 degrees and less than 360 degrees. The next step is (b) providing an end of the flexible hose cut at 90 degrees and (c) placing at least one hose clamp loosely over the flexible hose then (d) pushing the end of the flexible hose over the rigid, hollow shaft; the end of the flexible hose abutting the groove/bead. The clamp guide is then attached (e) by interfacing the arced surface with the groove/bead and resting the clamp guide arms against the flexible hose. Next, each of the hose clamps are positioned (f) over each of the registration areas and (g) the hose clamps are tightened, thereby compressing the flexible hose between the hose beads.

In another embodiment, a method of joining a flexible hose to a rigid, hollow shaft is disclosed. The rigid, hollow shaft has a head bead, a second bead and a third bead. The steps of the method include: (a) providing a clamp guide, the clamp guide has an arced surface for interfacing with a head bead, two clamp guide arms, a first bump aligned with the head bead, a second bump aligned with a second bead and a third bump over the third bead thereby forming a first registration area between the first bump and the second bump and between the second bump and the third bump. The arced surface has an inner diameter equal to an outer diameter of the rigid hollow shaft and an inner circumferential length greater than one half of the circumference of the rigid hollow shaft. The next step is (b) providing an end of the flexible hose cut at 90 degrees and (c) placing two hose clamps loosely over the flexible hose. Next, (d) pushing the end of the flexible hose over the rigid, hollow shaft, the end of the flexible hose abutting the head bead then (e) attaching the clamp guide by interfacing the arced surface with the first bump and resting the clamp guide arms against the flexible hose. A first hose clamp of the two hose clamps is positioned (f) over the first registration (between the first bump and the second bump) and a second hose clamp of the two hose clamps is positioned (g) over the second registration (between the second bump and the third bump). The first and second hose clamp are tightened (h), thereby compressing the flexible hose between the beads.

In another embodiment, a clamp guide for joining a flexible hose to a rigid, hollow shaft is disclosed. The rigid, hollow shaft has a groove or bead for interfacing with the clamp guide and at least two clamp bumps. The clamp guide has an arced surface for interfacing with the groove or head bead of the rigid, hollow shaft and two clamp guide arms. Each of the clamp guide arms have at least two bumps and each bump is aligned with one of the beads thereby forming registration areas between each pair of bumps. The arced surface has an inner diameter equal to an outer diameter of the groove and the arced surface also has an inner circumferential length greater than one half of the circumference of the groove.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
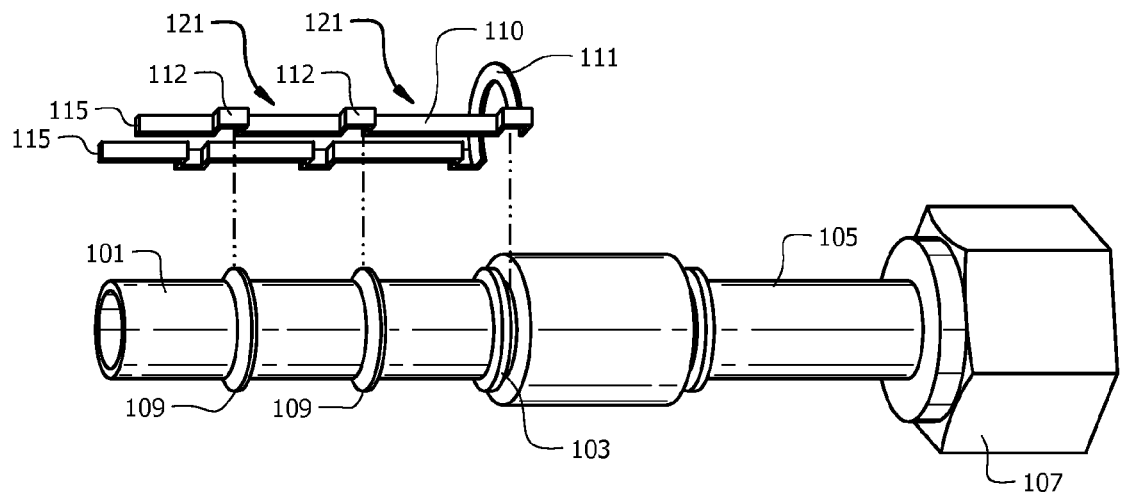
FIG. 1 illustrates a perspective view of a guide of the prior art.

Reference will now be made in detail to the presently preferred embodiments of the invention, examples of which are illustrated in the accompanying drawings. Throughout the following detailed description, the same reference numerals refer to the same elements in all figures.

Figure 2:
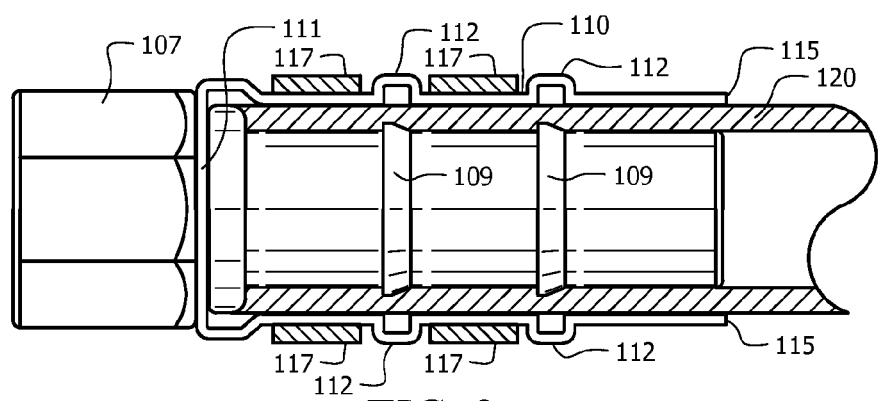
FIG. 2 illustrates a sectional view of a guide of the prior art.
Figure 3A:
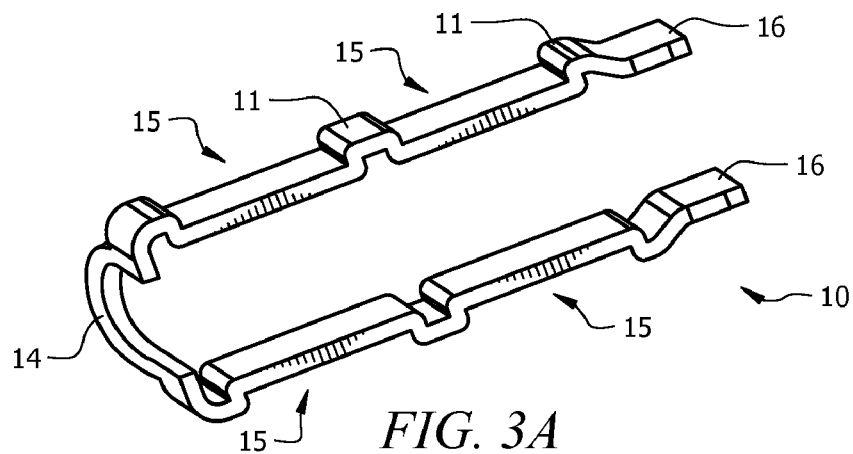
FIG. 3A-3D illustrates plan views of the present invention.
Figure 3B:
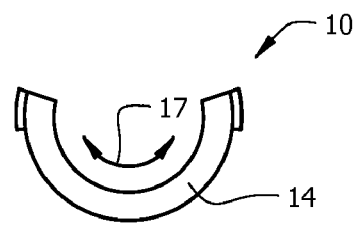
Figure 3C:
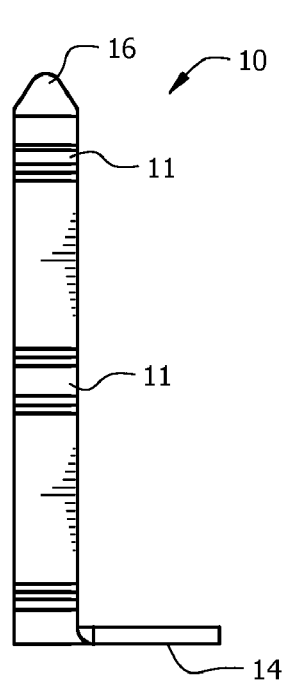
Figure 3D:
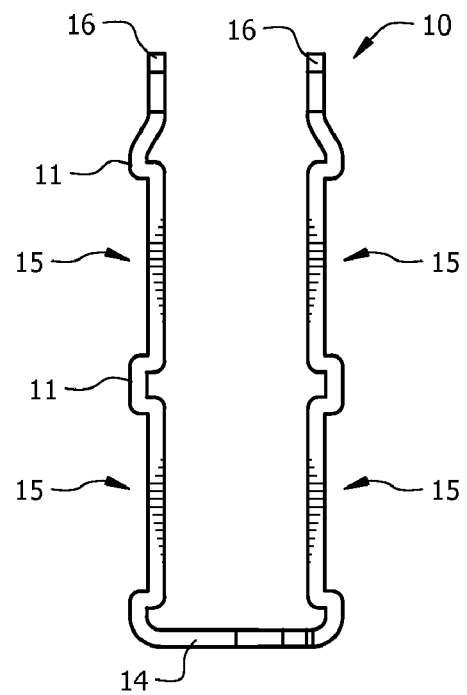

Referring to FIG. 1 and FIG. 2, a perspective view and a plan view of a clamp guide of the prior art is shown. The prior art for connecting a flexible hose 120 to a rigid, hollow shaft 101/105 includes a clamp guide 110 as shown in FIG. 1. The clamp guide 110 has registrations 121 between ridges 112 that align with beads 109 on a hose-connection end 101 of the rigid, hollow shaft 101/105. The clamp guide 110 has a semi-circular portion 111 that fits inside a groove 103 in the rigid hollow shaft 101/105 so that the clamp guide arms 115 are on exactly opposite sides of the flexible hose 120 when the flexible hose 120 is positioned over the receiving end 101 of the rigid, hollow shaft 101/105. The rigid, hollow shaft 101/105 is anticipated to be a component of a variety of connectors and fittings, one example is shown having a threaded fitting 107 at an end 105 distal from where a flexible hose 120 is attached using the clamp guide 110 and clamps 117.

Referring to FIG. 3A-D, a perspective view of the present invention is shown. The clamp guide 10 of the present invention includes two clamp guide arms 16 attached to each other by an arc 14 that has an inner surface 17 that is greater than 180 degrees and less than 360 degrees such that the circumferential length of the inner surface 17 of the arc 14 is greater than one half of the circumference of the rigid, hollow shaft 5/7 (see FIG. 4) and less than the circumference of the rigid, hollow shaft 5/7. Being such, as the hose clamps 30 (see FIG. 6) are tightened around the flexible hose 20, the flexible hose 20 compresses around the hose end 7 of the rigid hollow shaft 5/7 and the arc 14 is pulled tighter around the rigid, hollow shaft 5/7, thereby forming a stronger bond between the fitting/connector 3/5/7 and the flexible hose 20. Any known types of hose clamps 30 are anticipated.

In some embodiments, the arc 14 is interfaced with a groove 2 while in other embodiments, there is no groove 2 (e.g., groove bead 27 is absent) and the arc 14 is interfaced with a head bead 29.

There are several beads on the hollow rigid shaft 5/7. The beads 9/27/29 that retain the hose 20 are called beads 9 or hose beads 9. The bead 9/27/29 that aligns with the arc 17 and first bump 11 is the head bead 29. The groove bead 27 is present in some embodiments to form the groove 2 between the groove bead 27 and the head bead 29.

The clamp guide arms 16 have bumps 11 that align with beads or hose beads 9 (see FIG. 4) and registration areas 15, also aligned with the beads or hose beads 9. The hose clamps 30 (see FIG. 5-7) are placed over the clamp guide arms 16 such that the hose clamps 30 seat into the registration areas 15. In this way, as the hose clamps 30 are tightened, the flexible hose 20 is compressed in between the beads 9, providing a stronger connection between the flexible hose 20 and the rigid, hollow shaft 5/7 that resists separation under high pressure.

Although two registration areas 15 are shown, the present invention is not limited to two registration areas 15 and any number of registration areas 15 are anticipated including one registration areas 15.

It is preferred to fabricate the clamp guide arms 16 from a stiff, sturdy metal such as steel.

Figure 4:
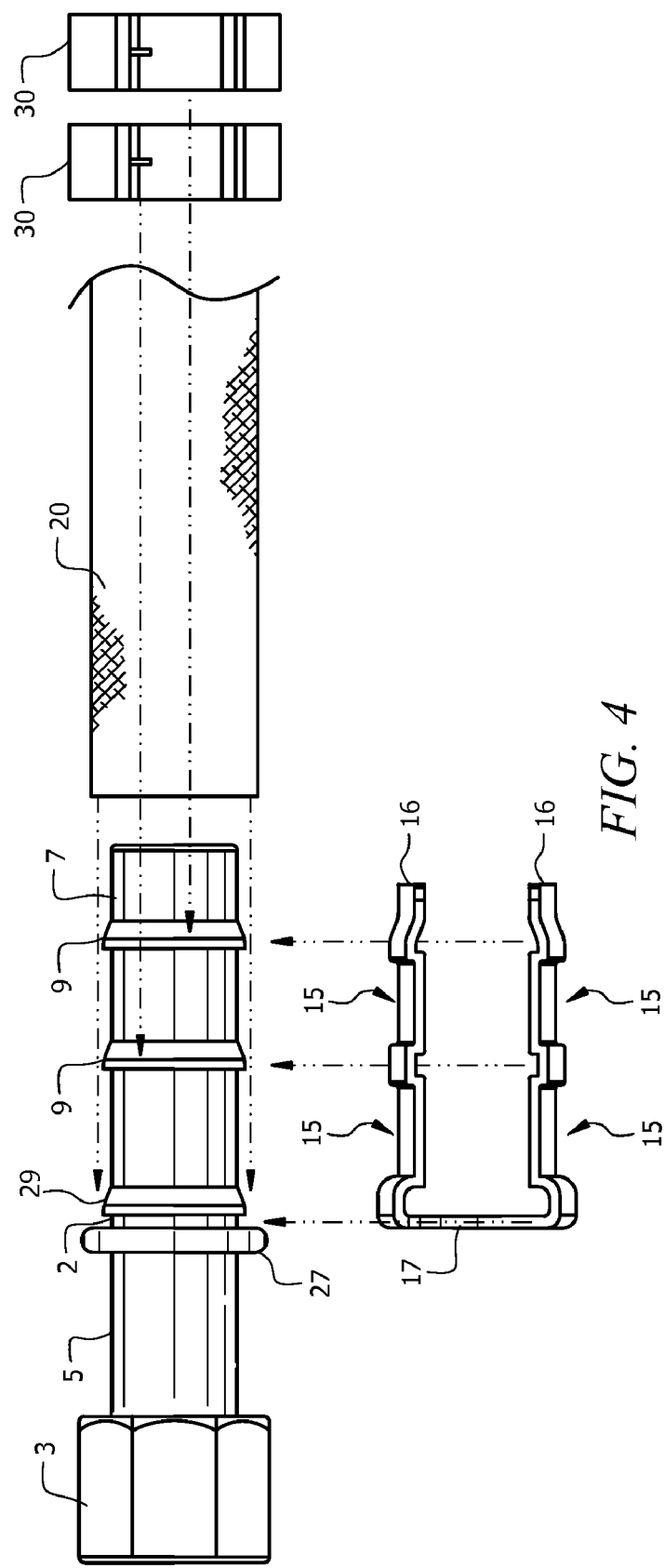
FIG. 4-6 illustrates plan views of the present invention as it attaches to a hose.
Figure 5:
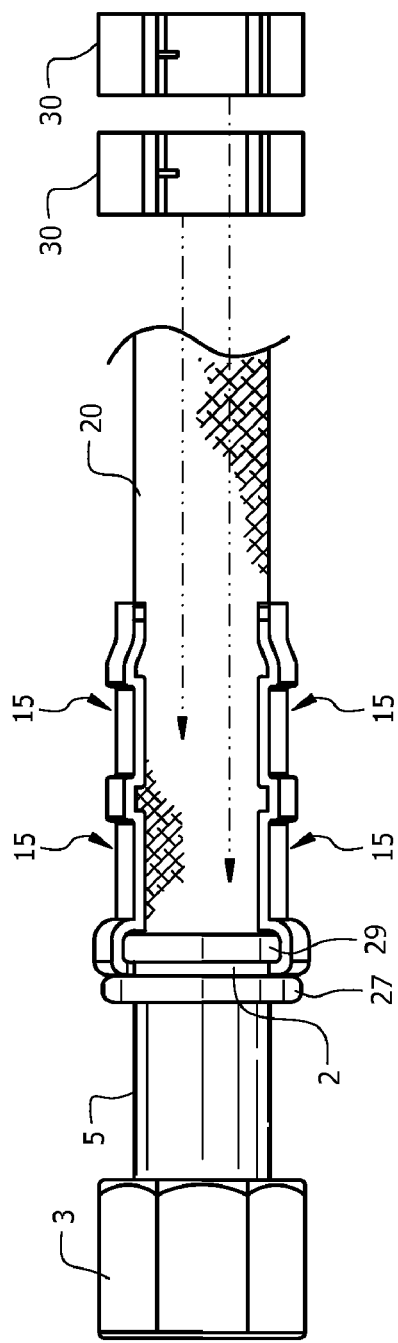
Figure 6:
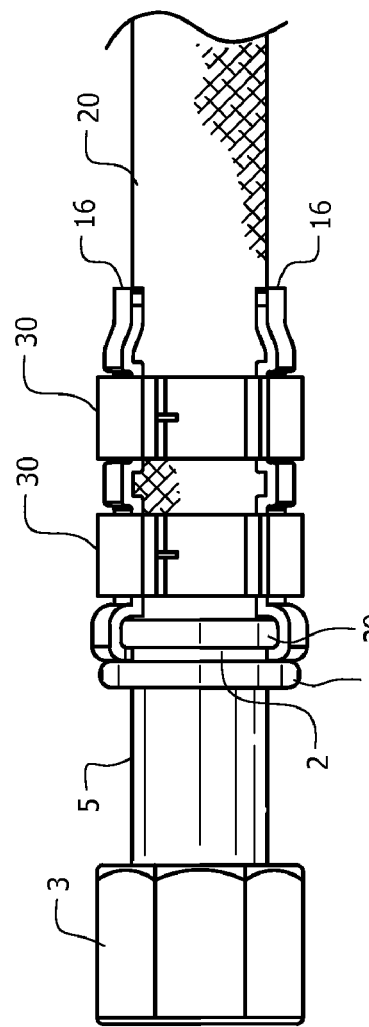

Referring to FIG. 4-6, plan views of the present invention as it attaches to a hose is shown. In FIG. 4, the flexible hose 20 is shown cut at 90 degrees and is ready to be pushed over the connection end 7 of the rigid, hollow shaft 5/7. To facilitate connection, two hose clamps 30 are placed loosely over the flexible hose 20 before the flexible hose 20 is pushed over the connection end 7. The clamp guide 10 is shown ready to be placed over the flexible hose 20, the arc 17 of which is positioned to interface with the groove 2 (or the head bead 29) of the hollow shaft 5/7, thereby aligning the registrations 15 with the spaces between the hose beads 9.

In FIG. 5, the clamp guide 10 is on the flexible hose 20, and the arc 17 of the clamp guide 10 is interfaced with the groove 2 or head bead 29 of the rigid, hollow shaft 5/7.

In FIG. 6, the hose clamps 30 are positioned in the registration areas 15 and tightened, thereby forming a strong bond between the flexible hose 20 and the rigid, hollow shaft 5/7. Although shown with a threaded fitting 3 at one end, any type of fitting/connection is anticipated including a second groove 2 and second set of beads 9 for joining two flexible hoses 20.

Figure 7:
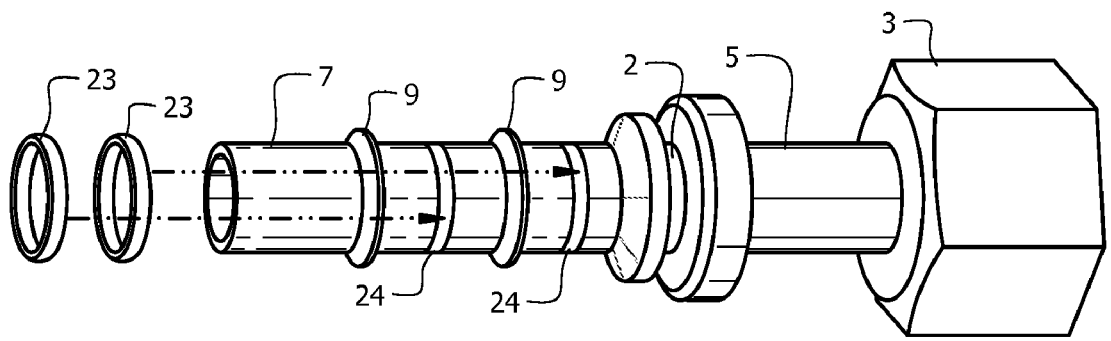
FIG. 7-8 illustrates a perspective view of o-rings adapted to the first embodiment of the present invention.
Figure 8:
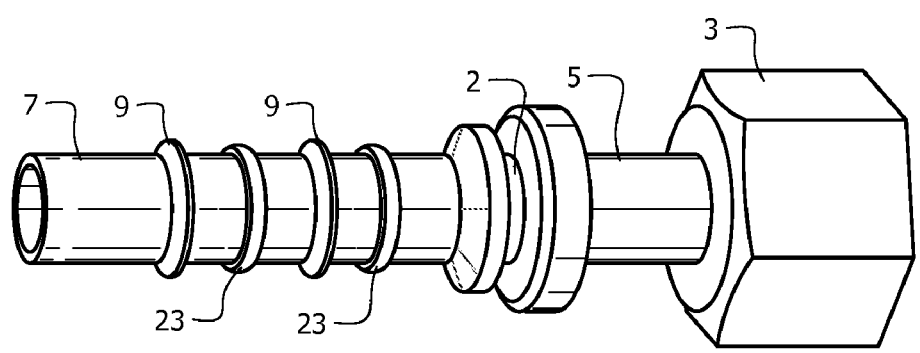

Referring to FIG. 7-8, a perspective view of o-rings adapted to the present invention is shown. In this, optional o-ring grooves 24 are fabricated (e.g., cut with a lathe) in the rigid, hollow shaft 5/7, preferably between each pair of the beads 9. The o-ring grooves 24 are fitted with o-rings 23 as known in the industry. The o-rings 23 protrude slightly above the o-ring grooves 24 and interface with an inner surface of the flexible hose 20 when the flexible hose 20 is pushed onto the rigid, hollow shaft 5/7, and the hose clamps 30 positioned over the registration areas and tightened, thereby reducing the chance of leakage.

Figure 9:
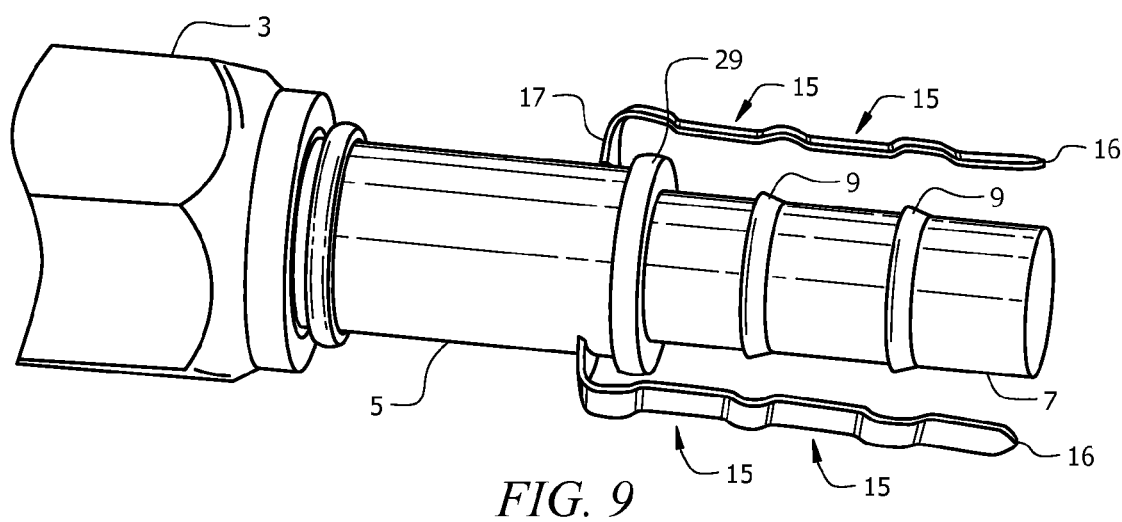
FIG. 9 illustrates a perspective view of an embodiment of the present invention interfaced with a fitting.

Referring to FIG. 9, a perspective view of an embodiment of the present invention interfaced with a fitting is shown. In this, a fitting 3 has a rigid, hollow shaft 5/7 having beads 29/9, one head bead 29 and two hose beads 9. The hose 20 (not shown in FIG. 9) fits over the connection end 7 of the rigid, hollow shaft 5/7 and butts up against the head bead 29. The inner arched surface 17 of the clamp guide 10 interfaces with the head bump 29 and two clamp guide arms 16 attached fit over the flexible hose 20 (not shown) and have bumps 11 that align with the beads 29/9. Clamps (not shown) fit in the registration areas and are guided to apply force correctly between the bumps when they are tightened.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A clamp guide for joining a flexible hose to a rigid, hollow shaft, the rigid, hollow shaft having at least two beads, the clamp guide comprising:

an arced surface for interfacing with a head bead of the at least two beads; and two clamp guide arms, each of the clamp guide arms having at least two bumps, each bump aligned with one of the beads thereby forming a registration area between each pair of bumps; the arced surface having an inner diameter equal to an outer diameter of the rigid hollow shaft, the arced surface having an inner circumferential length greater than one half of the circumference of the rigid, hollow shaft and the inner circumferential length less than the circumference of the rigid, hollow shaft;

whereas each of the two clamp guide arms is positioned at a respective end of the arced surface such that the two clamp guide arms are biased to one side of the rigid hollow shaft.

2. The clamp guide of claim 1, wherein the hollow shaft further includes at least one o-ring groove between two of the at least two beads and each of the at least one o-ring groove is fitted with an o-ring.

3. The clamp guide of claim 1, wherein the rigid, hollow shaft is part of a threaded fitting.

4. The method of claim 1, where the rigid, hollow shaft further includes a groove bead forming a groove between the groove bead and the head bead and the arced surface interfaces with the groove.

* * * * *